United States Patent
Miura

[15] 3,651,619
[45] Mar. 28, 1972

[54] APPARATUS FOR PURIFICATION OF GAS

[72] Inventor: Mitsugi Miura, 2-Chome Tezukayama, Sumuyoshi-ku, Osaka, Japan

[22] Filed: Mar. 30, 1970

[21] Appl. No.: 23,563

[52] U.S. Cl. ................................55/237, 55/455, 55/460, 55/DIG. 22, 261/79 A
[51] Int. Cl. ........................................B01d 47/10
[58] Field of Search ..................55/235–239, 455, 55/DIG. 22, 89, 92, 96, 460; 261/79 A

[56] References Cited

UNITED STATES PATENTS

| | | | |
|---|---|---|---|
| 1,783,813 | 12/1930 | Schneible | 55/238 |
| 1,818,742 | 8/1931 | Paradise | 55/238 X |
| 2,560,072 | 7/1951 | Bloomer | 55/237 X |
| 3,028,151 | 4/1962 | Kittle | 261/79 A X |
| 3,566,582 | 3/1971 | Yankura | 55/238 X |

Primary Examiner—S. Leon Bashore
Assistant Examiner—Robert L. Lindsay, Jr.
Attorney—George B. Oujevolk

[57] ABSTRACT

A perforated cylinder having a plurality of unit perforated cylinders arranged in series and having a pair of upper and lower slits formed in the tangential direction in the sidewall. The upper portion of the cylinder is sealed and the lower portion is opened. A gas charging chamber having a gas feed pipe and a liquid feed pipe is provided at the outside bottom of the first unit cylinder. A gas-liquid separation chamber having a cleaned gas discharge pipe and a separated liquid discharge pipe is located towards the top of the last unit cylinder. Gas-liquid separation chambers having separated liquid discharge pipes are provided at the top of the cylinder in the center and at the outside of the next stage cylinder and gas passages are provided at the outside of the perforated cylinders located between said two chambers and a liquid feed pipe is connected to the bottom of the unit perforated cylinder in the middle.

6 Claims, 8 Drawing Figures

Patented March 28, 1972 3,651,619

INVENTOR
Mitsugi Miura
BY Georges Cuyerolh
ATTORNEY

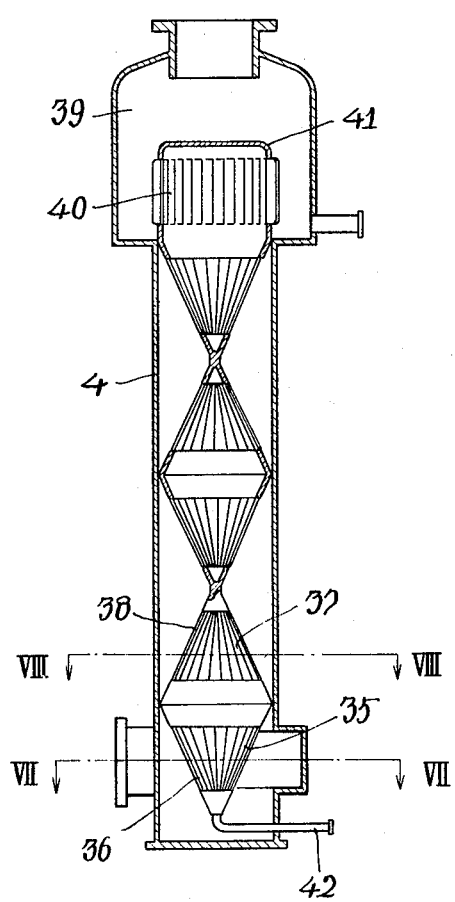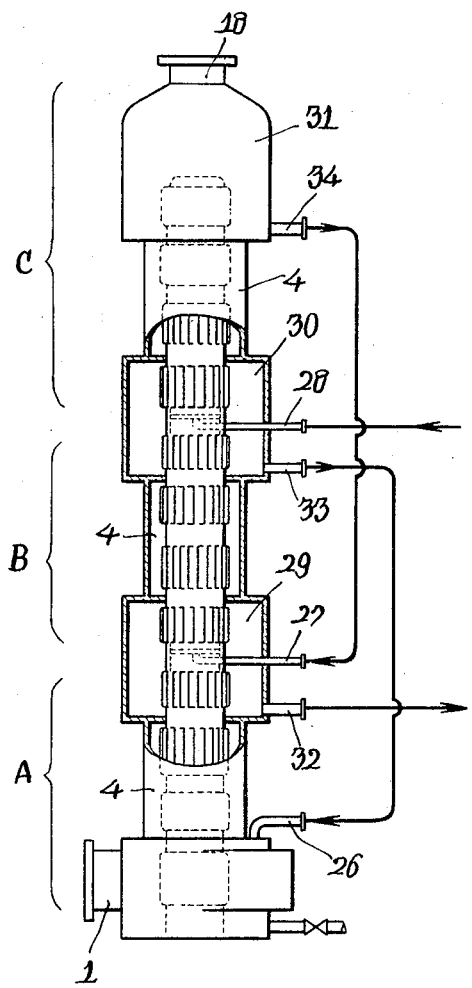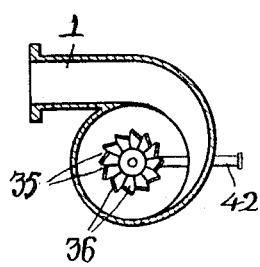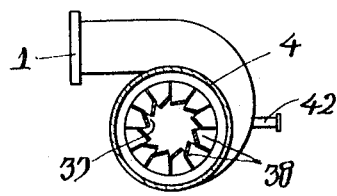

APPARATUS FOR PURIFICATION OF GAS

This invention relates to a method and apparatus for effectively removing fine particle solid substance such as dust, fumes or the like, contained in air or other gases, treating sulfurous acid gas, nitric acid gas, nasty odors or the like, and absorbing or neutralizing gases produced during chemical processes. More particularly, it relates to a method and apparatus for obtaining cleaned gases, wherein the gas to be treated is charged into a cylinder through lower slits of a cylinder having a set of upper and lower slits formed in the tangential direction in the side wall thereof, and a liquid at the bottom of said cylinder is drawn by the whirling and ascending force of the gas to cause it to rise in the form of liquid film along the inner wall of the cylinder, which liquid is then atomized by the gas entering from the slits, thus centrifugally separating the liquid containing impurities due to the whirling force of the gas when the gas is discharged from the upper slits.

Many methods as described below are well known for removing dust, sulfurous acid gas, etc.: (a) method, wherein a gas is brought into contact with a liquid by sending the gas upward from the bottom of a tower at a low speed and dropping atomized liquid droplets from a nozzle; (b) method, wherein a gas is passed upward from the bottom of a tower at a low speed and is brought into contact, on its way, with a liquid which has wetted the surface of thick-layer packing such as Raschig ring or the like; (c) method, wherein a gas is brought into contact with water droplets obtained by mechanically splashing water over a gas passage; (d) method, wherein a gas is sent into a liquid or to the surface of liquid at a high speed to splash the liquid by air velocity and the liquid droplets thus obtained is brought into contact with the gas; (e) method, wherein a gas is brought into contact with liquid by passing the gas through a layer of wire nets which are provided in a gas passage and wetted by the liquid; (f) method, wherein a gas is brought into contact with liquid by passing the gas through a narrow throat at a high speed and by violently spraying the liquid supplied onto the throat.

These methods, known as wet dust collecting methods, are widely used. However, in the method (a), the liquid disperses in a conical pattern, and therefore dust present in the central portion as well as between liquid lines is not brought into contact with liquid sufficiently. In the method (b), the gas passing along the wetted wall surface is brought into contact with liquid but the gas passing a distance from the wall surface is not brought into contact. Moreover, in the methods (a), (b), (c), (d) and (e), channeling phenomenon is caused, whereby the gas and liquid pass through places providing least resistance, respectively, that is, they select and pass through the most easily passable paths. Consequently, the distribution of liquid in relation to gas differs from place to place, and therefore uniform contact of gas with liquid is not obtained. In addition, the methods (a) and (b) are based on the principle that dust collection is carried out by collision of falling liquid droplets and the dust contained in the rising gas. If the ascending speed is high, the liquid droplets cannot fall. The ascending speed must therefore be decreased to less than 1 m./sec. Thus, since the relative velocity of the dust in the gas with respect to the liquid is low, the inertia force of the dust is small, and therefore the dust makes a detour around the liquid droplets together with the air current. As a result, the rate of collision with the liquid droplets due to inertia is decreased.

In the conventional methods, as the rate of the contact between the gas and liquid is bad, the liquid must be supplied repeatedly in order to improve the collection rate and gas removing rate and therefore the amount of liquid used is increased. In other words, the conventional methods are disadvantageous in that water drainage is increased.

Well known is the method wherein the gas is passed tangentially into a cylinder through the charging slits and the liquid at the bottom of a tank is drawn upward along the inner wall of the cylinder by utilizing the whirling and ascending force of the gas, and the liquid so drawn into the cylinder is atomized by the gas entering the cylinder. The conventional apparatus for achieving this method, however, is provided with only the charging zone having charging slitz and is not provided with the exhaust zone having exhaust slits, and the top of the cylinder is left opened. Consequently, it is observed that the greater part of the ascending gas is not forcibly exhausted through exhaust slits under centrifugal force as in the present invention but instead rises directly, through the center of the cylinder and therefore carries with it the floating droplets. Therefore, it is necessary to provide a mist separator. Even with such an apparatus in which the top of cylinder is opened, the efficiency of dust removal and gas separation can be increased, if the cylinders are stacked in several stages. In this apparatus, however, liquid is separated at each stage, and therefore it is necessary to supply another liquid to the next stage and the amount of liquid used increases. In addition, if the gas discharged into a gas-liquid separation chamber of large diameter with weakened whirling force is admitted into a liquid feed pipe at the next stage, the whirling motion is disturbed, thus producing turbulence and increasing power costs.

A principal object of this invention is to provide a method and apparatus for effectively removing impurities contained in gas by effectively bringing gas into contact with a small quantity of liquid atomized and dispersed into the gas to be treated.

Another object of this invention is to provide a method and apparatus for obtaining cleaned gas through centrifugal separation by circling gas.

The preferred embodiments of this invention are described below, which should be read in conjunction with the accompanying drawings in which:

FIGS. 4 and 5 are front sectional view, respectively, illustrating embodiments of compound gas processing apparatus according to this invention;

FIG. 6 is a front cross-sectional view of a gas processing apparatus wherein perforated cones are used instead of perforated cylinders;

FIG. 7 is a cross-sectional view taken on the line VII—VII of FIG. 6; and

FIG. 8 is a cross-sectional view taken on the line VIII—VIII of FIG. 6.

Figure 1:
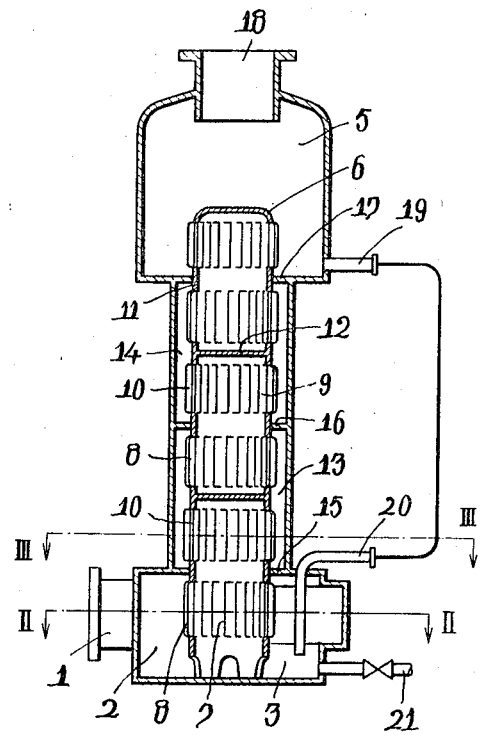
FIG. 1 is a front cross-sectional view of an embodiment of the unit gas processing apparatus according to this invention.
Figure 3:
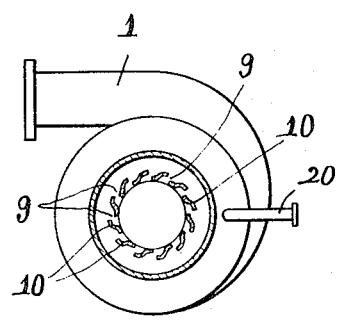
FIG. 3 is a cross-sectional view taken on the line III—III of FIG. 1.
Figure 2:
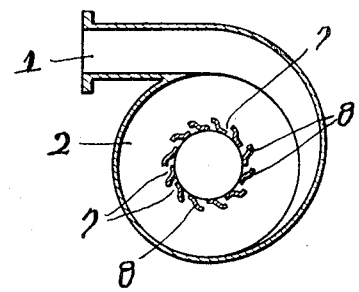
FIG. 2 is a cross-sectional view taken on the line II—II of FIG. 1.

Referring to FIGS. 1, 2 and 3, the numeral 1 indicates a gas feed pipe. The numeral 2 indicates a gas charging chamber, at the bottom of which a liquid tank 3 is provided. Above the gas charging chamber 2 is provided an outer drum 4, above which is provided a gas-liquid separation chamber 5. A perforated cylinder 6 is provided inside the outer drum 4.

The perforated cylinder 6 consists of a plurality of unit perforated cylinders 11 which are successively placed one upon another. Each of the unit perforated cylinders 11 comprises a charging portion 8 and a discharge portion 10. The charging portion 8 is provided with a plurality of gas charging slits 7 which are opened in the tangential direction of the side wall of the cylinder. The discharge portion 10 is provided with a plurality of gas discharge slits 9 which are opened in the tangential direction of the side wall of the cylinder. (Shown in FIG. 1 are three unit perforated cylinders connected in series.) These unit perforated cylinders 11, are of bottom opening type and their tops are sealed by means of partition plates 12. The doughnut-shaped space formed by the outer drum 4 and the unit perforated cylinders 11, is divided by means of division plates 15, 16 and 17 into a gas charging chamber 2, gas passages 13 and 14 and a gas-liquid separation chamber 5. The division plates 15, 16 and 17 are provided at the portions bordering the charging zone and the discharge zone of the perforated cylinder. The gas-liquid separation chamber is provided with a cleaned gas discharge pipe 18 at the top and a separated liquid discharge pipe 19 at the bottom. In addition, a liquid feed pipe 20 connected to the liquid tank 3 at the bottom of the gas charging chamber 2 and a drain port 21 are provided.

The charging slits and discharge slits formed at the side of the perforated cylinders in the tangential direction are provided in directions opposite to each other so that gas passing through will always whirl in the same direction. For example, in FIG. 2, the gas entering the charging slits in the clockwise direction is whirled clockwise and leaves the discharge slits. Consequently, the charging and discharging slits are provided opposite to one another as shown in FIGS. 2 and 3. In this apparatus, the areas of unit perforated cylinders, slits and gas passages are designed so that the gases pass through these openings at a high speed.

Described below is the performance of this apparatus. When a gas containing dust or the like is sent into the cylinder through the charging slits, the gas is passed upward, whirling within the unit perforated cylinders at a high speed. At this time, the liquid at the bottom is drawn by the gas and forms a liquid film on the inner wall of the unit perforated cylinder which goes up into the discharge zone through the charging zone. The liquid film passing upward in the charging zone is atomized by the gas entering from the charging slits in the tangential direction at a high speed, is effectively mixed with the gas and is whirled at a high speed. Wetted dust, liquid droplets or uncaught dust settle on the inner wall of the charging zone due to centrifugal force and are caught by the liquid film. The settled liquid film is again atomized by the entering gas. The liquid containing dust which is sent to the discharge zone through the charging zone is atomized by the gas which is whirled at a high speed and then discharged. Then, this liquid is mixed with the gas. The discharged liquid is passed upward in the gas passage, being drawn by the gas passing upward at a high speed along the gas passage 13 having the doughnut-shaped cross section formed by the perforated cylinder 6 and the outer drum 4. This liquid finally enters the cylinder together with the gas through the charging slits of the second-stage perforated cylinder 11.

The operation at the unit perforated cylinders after the first stage is different from that at the first stage. The gas entering from the charging slits is brought into contact with the liquid more effectively than at the first stage in order to atomize the accompanied liquid droplets, liquid film on the outer wall of the cylinder and the liquid film on the inner wall of the cylinder. The gas is finally discharged into the gas-liquid separation chamber 5 through the discharge zone at the final stage by repeating the above-described operations, that is, entering from the charging zone 8 of the first-stage unit perforated cylinder, discharging from the discharge zone 10, ascending along the gas passage 13, entering from the charging zone 8 of the second-stage unit perforated cylinder, discharging from the discharge zone 10, ascending along the gas passage 14 and entering from the charging zone 8 of the third-stage unit perforated cylinder. The cross-sectional area of the gas-liquid separation chamber is large enough to allow the gas discharged from the discharge zone to go up at low speed of 3 m./sec. and less. Therefore, the gas discharged from the slits continues to go up at a slow speed and is discharged from the cleaned gas discharge pipe 18, but the liquid containing dust does not go up together with the gas but advances at a high speed in the tangential direction towards the wall of the gas-liquid separation chamber and collapses with the wall or falls on the way thus collecting on the bottom. Thus, effective separation of gas from liquid is carried out. Therefore, this invention enables separation of liquid containing dust or gas required to be treated by effectively utilizing high-speed whirling force of the gas.

In the apparatus of the conventional known method wherein the upper end thereof is not sealed and the exhaust zone having a exhaust slit is not provided, there are disadvantages in that as the greater part of the gas rises directly from the opening end, the centrifugal force exerted to the liquid of liquid film is weak and the fine liquid droplets dispersed to the center portion are difficult to separate.

On the other hand, in the present invention, the upper edge of the apparatus is sealed and all the amounts of the gas are forcibly exhausted from the exhaust slit by means of centrifugal exhaust at a high speed, the liquid film ascending along the inner wall is accompanied by the exhaust gas and is subjected to centrifugal separation at a very high speed. In addition, the fine liquid droplets dispersed to the center portion are accompanied by the gas and reach the inner wall of the exhaust slit and thus join the ascending liquid film. Consequently, centrifugal separation can be effectively carried out, and it is unnecessary to provide a mist separator used in a general wet-type dust collector.

The width of the charging and discharge slits of this invention is generally small and is freely changeable to 1 mm., 5 mm., 10 mm. and etc., depending on the purpose of use. The less the width of the slit, the narrower the width of the gas to flow accompanying the atomized liquid droplets. Thus, the contact of gas with liquid is more effectively accomplished. Therefore, in collecting dust of super fine particles which are generally difficult to collect, the width of the slit is decreased. In the case of large-sized particles, they are settle to and are caught by the liquid film on the inner wall of the cylinder during the whirling motion due to centrifugal force, and therefore high effective dust collection is effected even if the width of the slit is large. For super fine fumes of 0.1 micron and less, efficiency can be improved by increasing the number of stages of unit perforated cylinders in addition to the slit width control. For easily removable large-sized particles, satisfactory dust collecting effect can be had by the only one-stage perforated cylinder. In other words, the width of slits and the number of stages of unit perforated cylinders are either increased or decreased depending on the degree of difficulty of dust separation.

Another advantage of this invention is that the consumption of liquid is very small, compared with conventional wet method. In this invention, the amount of liquid required is equal to the amount of liquid to be passed upward in the form of thin film along the inner wall of the unit perforated cylinder. Even if the number of stages of unit perforated cylinders is increased, the same liquid is passed upward, and therefore it is not necessary to increase the amount of liquid to be used. If the consumption of liquid decreases, the amount of liquid to be discharged decreases. According to the method of this invention, the amount of liquid to be discharged is small and is about one tenth to one fiftieth of the amount required in the conventional wet method using a nozzle spray. Further, after the greater part of the dust contained in the liquid is removed by precipitation or centrifugal separation, there still remains a small amount of the dust in the liquid. If the liquid discharged is refluxed into the liquid tank 3 to be repeatedly used, the amount of liquid to be discharged is about 1/30 – 1/100 of that required for the conventional method. The cost for drainage is markedly reduced. Moreover, according to this invention, the width of the opening of the slit is far larger than the size of dust contained in the liquid, and therefore the slits are never clogged with dust contained in the liquid to be refluxed for reuse. On the other hand, in the conventional wet-type dust collecting method using a nozzle, the nozzle is clogged with dust contained in the liquid because of the small diameter thereof. Therefore, discharged liquid containing dust cannot be refluxed for reuse.

In addition, according to this invention, the amount of liquid to be used is small. Therefore, in handling a gas to be treated, absorption liquid of high concentration is obtained.

Since the gas to be treated is whirled in the same direction according to this invention, pressure loss is negligible.

Figure 4:
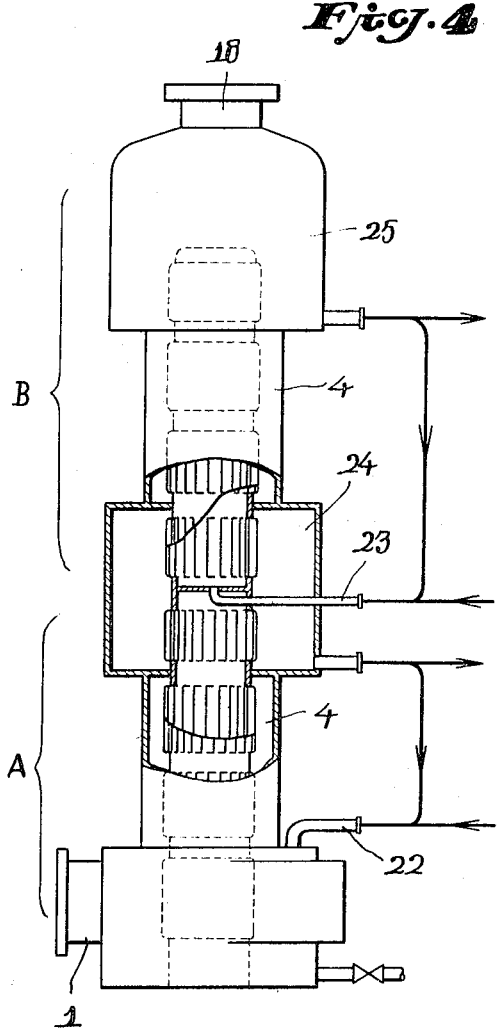

Described above is a method in which the same liquid is used in the perforated cylinders. This invention is applicable to the case where different kinds of liquid are used. For example, in case when a gas contains dust as well as sulfurous acid gas, dust is removed by use of water as the first liquid and then sulfurous acid gas is separated by using caustic soda solution as the second liquid. In this case, a compound gas processing apparatus as shown in FIG. 4, in which a unit gas processing apparatus A and a unit gas processing apparatus B are connected in series, is used. In this case, the gas charged from the gas feed pipe 1 comes into contact with the water supplied from a liquid feed pipe 22 in the unit gas processing apparatus A, where dust contained is separated in a gas-liquid separation chamber 24. This gas is then sent into the unit gas processing apparatus B, where it comes into contact with the caustic soda solution supplied from a liquid feed pipe 23. Then, the caustic soda solution in which sulfurous acid gas has been neutralized is separated in a gas-liquid separation chamber 25 and is discharged from a discharge pipe 18. In this case, needless to say, whirling movement is continuously carried out in the same direction after the gas enters the charging slit of the first stage and until it is discharged from the exhaust slit of the last stage.

In the drawing, only the ascending direction of the gas is shown. The direction is not limited to the ascending only, but the gas can be advanced in any direction. For example, when concentrated absorption liquid is desired to be obtained in the sulfuric acid producing process, the counter current process is possible as shown in FIG. 5. In an apparatus wherein a plurality of unit gas processing apparatus A, B and C are provided in series, the gas to be treated is passed upward in the first unit gas processing apparatus A, the second unit gas processing apparatus B and the third unit gas processing apparatus C successively while whirling movement is kept to be performed in the same direction. On the other hand, the absorption liquid is supplied from a liquid feed pipe 28 to the bottom of the third unit gas processing apparatus. Then, the absorption liquid separated in a third separation chamber 31 is supplied from a feed pipe 27 into the second unit gas processing apparatus B. liquid separated in a second separation chamber 30 of the second unit gas processing apparatus B is supplied to the bottom of the first unit gas processing apparatus A from a liquid feed pipe 26.

If a gas to be treated is brought into contact with the absorption liquid by counter-flowing them as described above, components to be separated from the gas are effectively absorbed into the absorption liquid. As a result, the concentrated absorption liquid is obtained from a first separating chamber 29.

Unit gas processing apparatus used in the compound gas processing apparatus shown in FIGS. 4 and 5 consist of two unit perforated cylinders connected in series which are shown in FIG. 1. The number of unit cylinders can be one or more than one, depending on the kind and nature of the gas. In the case of one cylinder, outer drums 4 provided at the outside of perforated cylinder as shown in the drawing can be eliminated. Thus, the gas charging chamber of each unit gas processing apparatus is adjacent to the gas-liquid separation chamber. In case when a plurality of unit perforated cylinders are used and liquid of different kinds are used as shown in FIG. 4, or in case when a plurality of unit perforated cylinders are provided and the gas and the liquid are used in a counter-current arrangement as shown in FIG. 5, the contact of gas with liquid as described above is carried out in each unit perforated cylinder. It is needless to say that the number of unit gas processing apparatuses can be either increased or descreaded as occasion demands.

Shown in FIGS. 6, 7 and 8 is another embodiment of this invention, wherein the shape of unit perforated cylinder of the unit gas processing apparatus is different from the one described above. The apparatus of this embodiment is so constructed that an open-ended reverse cone 36 having charging slits 35 at the side wall thereof is arranged in series with an open-ended cone 38 having discharge slits 37 at the side wall thereof, instead of using cylinders. Their respective ends are connected to a separator 41 provided within a gas-liquid separating chamber 39. In the processes of charging the gas to be treated from a plurality of slits 35 of the reverse cone 36 and discharging it from a plurality of discharge slits 37 of the cone 38, the gas is passed upward in whirling movement in the same manner as shown in FIG. 1, while the liquid film going up along the wall of the cone is atomized into the gas. When this gas is discharged from discharge slits 40 of a separator 41, the liquid contained in the gas is separated by centrifugal force from the gas, thus permitting to obtain cleaned gas.

When the cone is used as shown in this embodiment, the angle of direction change of gas charged or discharged is smoother than in the case of using perforated cylinder, and therefore pressure loss is smaller.

Described above are three embodiments of this invention, in which one kind of liquid is used in series, one kind of liquid is used in countercurrent and different kinds of liquid are used. As is seen from the above description, the biggest advantage of this invention is that, in all cases, the gas charged maintains its whirling motion in the same direction until it is discharged.

As described above, this invention has many features and advantages. That is, according to this invention, the removal of fine particle solid substance such as dust, fumes or the like contained in gas, the removal of sulfurous acid gas, chloric acid and nasty odor constituting an air pollution source and absorption or other treatments of gas produced during chemical processes can be effectively accomplished. Moreover, compared, with the conventional washing-tower type wet method, the separation coefficient of dust or gas to be treated is high, consumption of liquid is small and drainage is easily carried out. In addition, concentrated absorption liquid can be obtained.

I claim:

1. A gas purification apparatus comprising in combination:
   a. an elongated vertical tower housing having defined higher, middle, and bottom sections with at least one closed curved wall at said bottom section, a gas feed pipe (1) coupled to said bottom section by a pipe convolution for tangentially feeding gas into said bottom section;
   b. a separation tower in said housing with at least two pairs of units, said first or bottom and second units forming one pair, said third and top or fourth units forming a second pair, said units being disposed vertically one above the other and being hollow chambers having cylindrically or conically shaped outer walls with elongated substantially vertical slits therein for the passage of gas through said slits, each slit having a lip extending outwards from the outer wall forming a gas guide path substantially tangential to said outer wall to guide gas into or out of said slit, the lips in the first or bottom unit being charging lips extending outward in a direction designed to intercept the tangential gas flow fed by the gas feed pipe convolution, the lips in said second unit being discharging lips extending outward in a direction opposite from those in said first unit, the lips in the third unit extending outwards in a direction substantially similar to those in said first unit while the lips in said fourth or top unit again extending outwards in a direction substantially similar to that in said second unit so that gas enters said first unit from said tower housing, exits from said second unit into said housing, reenters said third unit and again exits from said fourth or upper unit into said housing;
   c. a liquid supply zone (3) disposed to supply liquid into said first unit;
   d. a first housing partition plate (15) separating said housing middle section from said bottom section so that gas flowing into said bottom section cannot go into said middle section without passing into said separation tower first or lower unit, but upon being discharged from said second unit, passes into said middle section and a second housing partition plate (17) similarly separating said housing middle and higher sections;
   e. at least one unit closure (12) between said first and second pairs of units preventing gas from one pair of units going to the second pair of units without traveling back into the housing; and, f. a clean gas discharge pipe at the upper part of said higher section, and a liquid discharge outlet (19) at the lower part of said higher section.

2. A gas purification apparatus as claimed in claim 1, including a feedback pipe (20) from said liquid discharge outlet (19) to said liquid supply zone (3).

3. A gas purification apparatus as claimed in claim 1, there being at least three pairs of units all except the top and bottom unit being in said middle section.

4. A gas purification apparatus as claimed in claim 1, said units in at least said two pairs being conical, said pairs being formed by open end reverse cones (36, 38) connected at the base, said unit closure being between the apex of the first and second pairs of reverse cones.

5. A gas purification apparatus as claimed in claim 4, there being at least three pairs of units all except said top and bottom units being in said middle section, said top unit being cylindrical.

6. A gas purification apparatus as claimed in claim 1, including in said higher section of the tower housing an inner wall at a substantial distance from top unit slits, said higher section forming a gas liquid separation chamber.

* * * * *